(12) United States Patent
Finegold et al.

(10) Patent No.: US 9,684,153 B2
(45) Date of Patent: Jun. 20, 2017

(54) SYSTEM AND METHOD FOR PRODUCING AN APERTURE ON AN OPTICAL ELEMENT OF AN INFRARED OPTICAL SYSTEM

(71) Applicant: Seek Thermal, Inc., Goleta, CA (US)

(72) Inventors: Joseph G. Finegold, Santa Barbara, CA (US); Scott Dayton, San Jose, CA (US)

(73) Assignee: Seek Thermal, Inc., Santa Barbara, CA (US)

( * ) Notice: Subject to any disclaimer, the term of this patent is extended or adjusted under 35 U.S.C. 154(b) by 213 days.

(21) Appl. No.: 14/244,553

(22) Filed: Apr. 3, 2014

(65) Prior Publication Data
US 2015/0286038 A1    Oct. 8, 2015

(51) Int. Cl.
| | | |
|---|---|---|
| B05D 1/28 | (2006.01) |
| G02B 13/14 | (2006.01) |
| G02B 5/00 | (2006.01) |
| G03B 9/02 | (2006.01) |
| B41M 1/30 | (2006.01) |
| B41M 1/34 | (2006.01) |

(52) U.S. Cl.
CPC ............ *G02B 13/14* (2013.01); *B05D 1/28* (2013.01); *B41M 1/30* (2013.01); *B41M 1/34* (2013.01); *G02B 5/005* (2013.01); *G03B 9/02* (2013.01)

(58) Field of Classification Search
CPC .......... B05D 1/28; G02B 13/14; G02B 5/005; G03B 9/02
See application file for complete search history.

(56) References Cited

U.S. PATENT DOCUMENTS

| | | | | |
|---|---|---|---|---|
| 4,928,587 A | * | 5/1990 | Glover | B41F 17/001 101/163 |
| 5,796,514 A | | 8/1998 | Chipper | |
| 6,473,238 B1 | * | 10/2002 | Daniell | G02B 3/005 348/E13.028 |
| 7,440,192 B2 | | 10/2008 | Morrissey et al. | |
| 2003/0116047 A1 | * | 6/2003 | Cutcher | B41F 15/0895 101/492 |
| 2006/0119953 A1 | * | 6/2006 | Morrissey | G02B 5/04 359/640 |
| 2009/0040629 A1 | | 2/2009 | Bechtel et al. | |
| 2009/0185291 A1 | | 7/2009 | Tsuchiya et al. | |
| 2010/0253832 A1 | * | 10/2010 | Duparre | H01L 27/14618 348/360 |
| 2012/0269564 A1 | * | 10/2012 | Collins | B41J 3/407 400/76 |

(Continued)

FOREIGN PATENT DOCUMENTS

| | | |
|---|---|---|
| EP | 1 605 520 | 12/2005 |
| WO | WO 97/15813 | 5/1997 |

OTHER PUBLICATIONS

TOSH Technical Data Sheet STB-NT, "STB-NT Pad Printing Ink."

(Continued)

*Primary Examiner* — James M Mellott
(74) *Attorney, Agent, or Firm* — Knobbe Martens Olson & Bear LLP

(57) ABSTRACT

A system and method for producing an optical aperture for an optical element of an infrared optical system includes placing the optical element in a printer and applying ink in an image of the optical aperture to a curved surface of the optical element.

20 Claims, 3 Drawing Sheets

(56) References Cited

U.S. PATENT DOCUMENTS

2014/0043691 A1* 2/2014 Tomioka ................ G02B 13/14
359/680

OTHER PUBLICATIONS

R. Gooch, et al., "Wafer-level vacuum packaging for MEMS," J. Vac. Sci. Technol. A 17(4), Jul./Aug. 1999, p. 2295-2299.
International search report and written opinion for PCT/US2015/023783, mailed Jun. 16, 2015, in 10 pages.

* cited by examiner

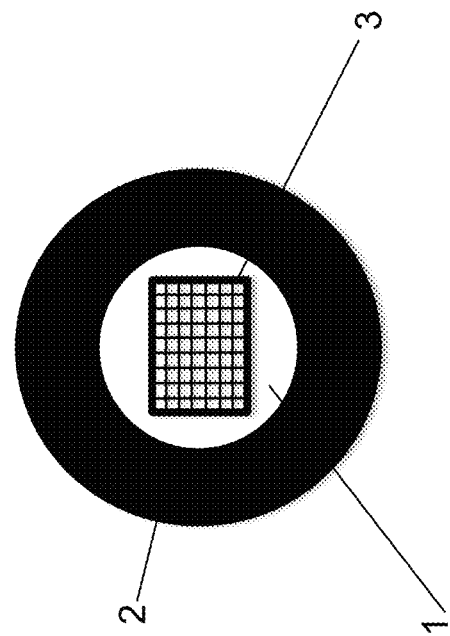
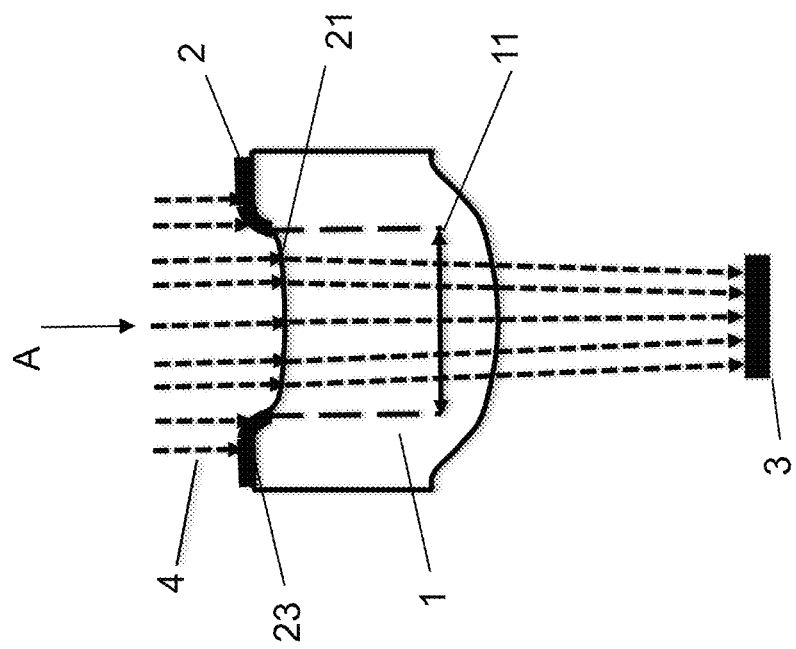
Figure 1b
Figure 1a

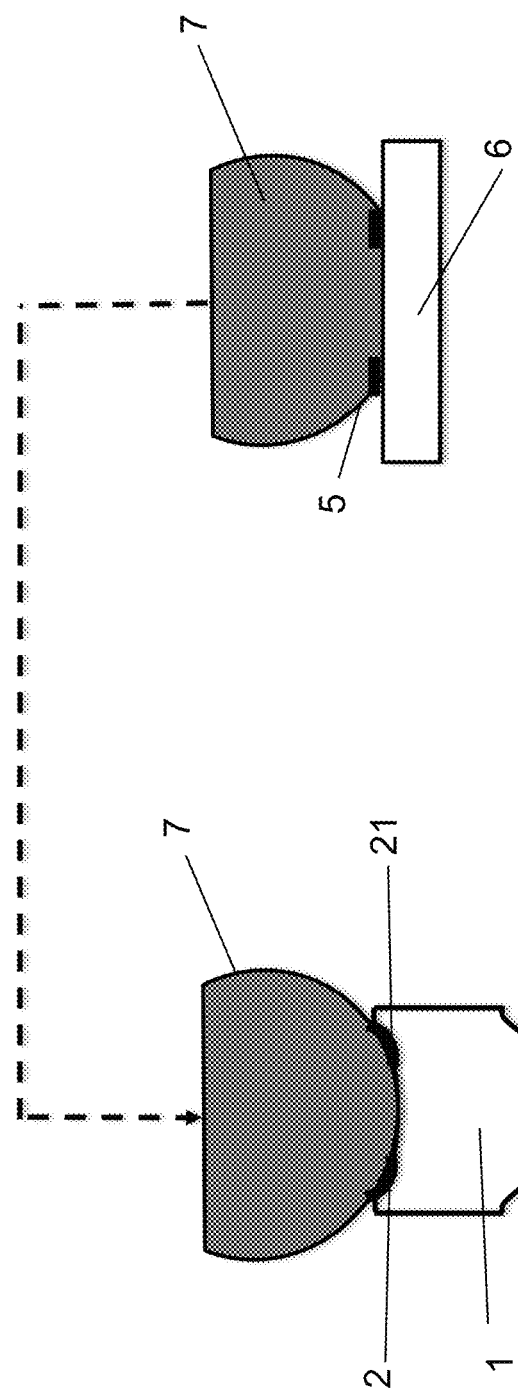

SYSTEM AND METHOD FOR PRODUCING AN APERTURE ON AN OPTICAL ELEMENT OF AN INFRARED OPTICAL SYSTEM

BACKGROUND

The invention relates to optics for optical systems such as cameras including infrared cameras and in particular to a system and method for producing the aperture component of such an optical system.

The increasing availability of high performance, low cost uncooled infrared imaging devices, such as bolometer focal plane arrays, is enabling the design and production of mass produced, consumer oriented IR cameras. Such imaging sensors have long been expensive and difficult to produce, thus limiting the employment of high performance, long wave imaging to high value instruments, such as aerospace, military, or large scale commercial applications. Mass produced IR cameras have different design requirements to achieve lower costs.

BRIEF DESCRIPTION OF THE DRAWINGS

FIG. 1A is a top view of an optical element having a printed optical aperture, according to an illustrative embodiment;

FIG. 1B is a view in direction A of FIG. 1A of the optical element showing an infrared sensor, according to an illustrative embodiment;

FIG. 2 illustrates a method of producing an aperture on an optical element of an infrared optical system, according to an illustrative embodiment;

DETAILED DESCRIPTION OF ILLUSTRATIVE EMBODIMENTS

Figure 3:
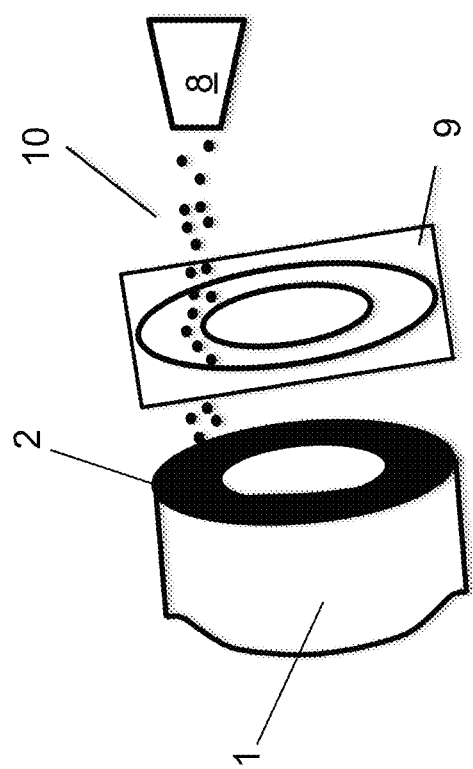
FIG. 3 illustrates a method of producing an aperture on an optical element of an infrared optical system, according to alternative embodiments.

One or more embodiments described herein may provide significant cost savings and improved ease of manufacture for an element common to all infrared cameras, the light stop aperture component.

One or more embodiments described herein may produce improved optical performance, with a low transmissivity (e.g., less than about 10%) and/or a high reflectivity (e.g., more than about 90%).

One or more embodiments may produce a durable aperture, such as an aperture able to withstand rubbing, poking, solvents, hot and cold environments and/or high and low humidity, etc. for the duration of the customer warranty (e.g., two years) and beyond.

One or more embodiments may produce a cost-effective aperture, such as one that would cost less than one cent per optical element to produce.

One or more embodiments may product an aperture that is relatively easy to manufacture.

One or more embodiments may relieve the manufacturer of the requirement of forming the physical aperture with very accurate mechanical positioning to ensure that the aperture stop is installed in the right location, within acceptable tolerances.

According to one embodiment, a method for creating an aperture in a camera or other optical system is disclosed. The method applies an opaque paintable or printable material to a transparent or reflective element, where the material is applied in the shape and size required for the aperture. In a particular embodiment, the aperture is pad printed onto the element, typically the lens itself, and the loading, printing and unloading may be fully automated. This embodiment may be used in optical systems comprising infrared cameras and using pad printing inks that are opaque to infrared radiation, stable over time, and/or are mechanically suitable for IR camera applications.

Referring first to FIG. 1A, an infrared camera having an optical element 1 and an infrared sensor 3 is shown. Optical element 1 (e.g., a lens, mirror, prism, etc.) may comprise surfaces having one or more shapes, sizes or dimensions. In this embodiment, optical element 1 has a curved surface 21, which is concave in this embodiment, but may be convex in an alternative embodiment. As shown, in operation, light 4 or, more generally, electromagnetic radiation, enters optical element 1. Optical element 1 may be configured to capture and/or focus incoming light 4. Curved surface 21 is configured to receive light and transmit the light along a path toward infrared sensor 3. Curved surface 21 defines a recess within optical element 1.

An optical aperture 2 is configured to occlude light from areas that are not in the imaging path to a focal plane at an infrared sensor 3 to avoid distortion. In one embodiment, aperture 2 comprises a material that will block light 4 at wavelengths of interest (e.g., 8-12 microns). Aperture 2 is shown in a circular or ring-shaped embodiment, but may alternatively have other shapes, sizes, thicknesses, etc. Aperture 2 limits the field of view of the sensor 3 to light from the center portion of lens 1. In one embodiment, aperture 2 is applied to the light-receiving portion, size or end of optical element 1, though in alternative embodiments, aperture 2 may be applied to the light-emitting portion, size or end of optical element, both such sides, and/or other sides or portions of optical element 1. Aperture 2 may be disposed on at least a portion of the curved surface of the optical element. Further, aperture 2 may be applied to other portions of an optical system containing optical element 1.

Infrared sensor 3 may comprise any of a variety of infrared sensors, such as a focal plane array (FPA) sensor 3. Sensor 3 may be part of a vacuum package assembly (VPA). Sensor 3 may comprise a bolometer. Sensor 3 and optical element 1 may comprise portions of an optical system, such as an optical camera, which may comprise other elements, such as additional optical elements, housing, heat sink, cooling element (such as a thermo-electric cooler), electronic devices (e.g., lead lines, memory circuitry, driver circuitry, etc.), etc.

In one embodiment, for a small IR camera suitable for consumer or widespread commercial use, the lens diameter may be about 10 mm or less. The total height of the focal plane-lens stack may be on the order of 10 mm or less. Aperture 2 may be configured to block all but about 25% or less of the incoming light and may be sized and placed to within approximately +/−20 microns or less for best optical performance. Optical element 1 may have an opening diameter 11 of about 10 millimeters or less, wherein optical aperture 2 has a diameter (inner or outer diameter) of between about 10 and about 90 percent of the opening diameter 11 of the optical element. In another embodiment, optical aperture 2 has a diameter of between about 60 percent and about 80 percent of the opening diameter 11 of the optical element.

Referring now to FIG. 2, a method of producing an aperture on an optical element of an infrared optical system will be described, according to an illustrative embodiment. While a single lens is typical of a small IR camera, more complex optical arrangements with more than one optic element may alternatively be used. The method comprises placing the optical element in a printer and applying ink in an image of the optical aperture to a curved surface of the optical element. Placing the optical element in a printer may comprise placing in a fixture that holds the optic in a known location with high accuracy. Aperture 2 may be formed by selectively applying (e.g., coating, printing, painting, etc.) ink to at least a portion of optical element 1. The ink forms an aperture stop directly on the optical element. A further step may comprise mating the optical element with an infrared sensor, for example by coupling the optical element to a housing coupled to the sensor (e.g., a camera core having a lens, lens housing, an IR sensor and electronics, though in alternative embodiments a heat sink, thermoelectric cooler, shutter and/or other components may also be present).

Optical element 1 may be any transparent or reflective element (e.g., lens, magnifier, mirror, etc.) in an optical path suitable for placement of an optical stop, or other optical elements. As shown in FIG. 2, optical element 1 comprises a curved surface or portion 21. In this method, applying uses a conformable pad 7 to apply ink to a curved portion while maintaining dimensional tolerance and shape control.

Applying ink may be done using any of a variety of processes, such as pad printing, inkjet printing, silk screening, indelible marker, etc. The ink may be opaque to light at the wavelength to which the imager (e.g., infrared sensor or other sensor) responds. In one embodiment, high reflectivity is used to avoid heating up the optic with absorbed light. The ink may adhere well to the optical element or to an antireflective coating applied over the optical element. The ink may be durable (e.g., able to withstand rubbing, poking, solvents, hot and cold environments, and/or high and low humidity, etc.).

As shown, in this embodiment the printed ink aperture stop extends into the concave portion of optical element 1 at least partially, while another portion of the aperture stop is printed on a flat outer surface 23 closer to the received light.

One embodiment utilizes a pad printer to print the aperture stop in ink onto an optical element. The aperture is defined using a custom pad printer cliché. Various pad print-compatible inks are suitable, such as a two-part epoxy ink, such as Tosh STB, manufactured by TOSH, S.r.l., Italy. The pad may be a round base pad, such as shown in FIG. 2, or other pad shapes, sizes or configurations. The ink may come in a variety of colors which can be printed in accordance with a look and feel of a consumer product that is to use the IR camera lens. In this embodiment, applying ink further comprises creating an etched image of the optical aperture in a print cliché, inking the print cliché, and pad printing the optical element with the inked print cliché.

A pad printer is one suitable approach to printing a 2-D image onto a 3-D object, such as a curved lens, in a controllable fashion. A custom etched cliché 6 is created with the desired aperture pattern. The ink 5 is transferred to the printing pad 7 from the cliché 6, and the pad 7 then prints the aperture 2 onto optic element 1. Any of a variety of automated pad printers compatible with inks suitable for the aperture application, particularly for small IR cameras, may be used.

Pad printers may be automated and are compatible with robotic parts handling, so the entire aperture printing process may be automated. In a particular embodiment, the aperture is pad printed directly onto a small (<10 mm dia.) IR camera lens. In one example, a manufacturing system is configured to load, print and unload the optical element in an automated fashion, i.e., robotically, without requiring manual human intervention.

Alternative embodiments such as spray painting, marking, inkjet printing, or silkscreen are suitable approaches as well. The etched image may be instantiated onto a mask or silkscreen, or as a programmed mask pattern to define the aperture, and the aperture may be applied to the camera element in the form of a suitable opaque material compatible with one or more of the above processes. Silk screeners, commercial inkjets, and marking machines may in many cases be automated and compatible with robotic parts handling.

The applying process may be performed in a short enough time period to achieve a fast cycle time of the manufacturing process. The ink may be quick-drying (e.g., less than about 2 minutes or less than about 1 minute) to minimize work in process inventory of printed or painted optic drying. The printed lenses may dry while being moved from location to location on a rotary table with a modest number of positions (e.g., 12 or less). The ink may be sufficiently durable to withstand rubbing, solvents, hot and cold environments, and/or high and low humidity.

EXAMPLE

In a particular tested implementation, a lens for a small IR camera, on the order of 7 mm in diameter, was made with an optical aperture that leaves the center 3.4 mm (dia.) of the lens clear. To save cost and complexity, the lens for this embodiment of a camera is intended to be the sole optic element in the optical path so the lens will not be covered, thus also exposing the aperture. A Tosh Micro 90 automated pad printer, utilizing a standard robotic parts handler was used to load, print and unload the lenses from a tray. The printer printed the apertures onto the lenses, made from a molded Chalcogenide optic material coated with an antireflective coating and pre-cleaned. In this particular embodiment, a two part epoxy ink, black Tosh STB ink was used.

The above described setup is able to print an aperture with tolerances on size and placement of +/−20 microns at a rate of 15 per minute for a single-strike printing and 5 per minute for triple-strike printing. This particular ink dries to touch in 20 seconds and fully cures with complete cross linking in 72 hours at room temperature, or a few minutes at elevated temperature at a cost of less than $0.01 each for the aperture. This is a significant improvement in unit cost and manufacturability over any separate component aperture implementations. The ink provides for adequate durability and dimensional stability over time and is used commercially in challenging applications such as on automotive windshields and cosmetically critical applications such as on branded sunglass lenses, indicating its suitability for the IR camera lens application.

As shown above, the pad printer embodiment is cost-effective, having excellent manufacturability and achieving the desired performance. However other coated aperture implementations are contemplated. As shown in FIG. 3, a source 8 of coating material 10 and pattern 9 may be employed to produce a coated aperture 2 on optic element 1. The source 8 may include inkjet printers, paint sprayers, markers, silk screeners, any of which is capable of achieving the required tolerances, and the materials 10 may be a variety of materials compatible with the sources as long as the resulting coating is opaque in the spectral region of interest.

The pattern 9 may be of various forms, including a paint/ink mask, a silkscreen or a programmed pattern in a printer such as an inkjet printer, or marking machine. Systems of these types are also suitable for automatic operation including automated loading/unloading.

The embodiments described herein are exemplary. Modifications, rearrangements, substitute materials, etc. may be made to these embodiments and still be encompassed within the teachings set forth herein. One or more of the steps, processes, or methods described herein may be carried out by one or more manufacturing devices, under control of a processing circuit being suitably programmed.

While the exemplary embodiments described herein are directed to optical elements for infrared sensor systems, optical elements for other applications, such as visible light systems, may fall within the scope of the teachings. While the aperture is applied to a curved surface of an optical element in the illustrative embodiments herein, the aperture may alternatively be applied to one or more flat surfaces of the optical element in alternative embodiments.

The invention claimed is:

1. A method for producing an infrared optical system consisting of an infrared sensor, an optical element having a curved surface, and a single ink layer, the method comprising:
    placing the optical element in a printer; and
    applying ink in a single layer to at least a portion of the curved surface of the optical element to form an optical aperture for the infrared optical system directly on the optical element,
    wherein the curved surface of the optical element with the optical aperture is an external surface of the infrared optical system.

2. The method of claim 1, wherein at least a portion of the ink extends into a recessed portion defined by the curved surface.

3. The method of claim 1, further comprising mating the optical element with the infrared sensor.

4. The method of claim 3, wherein the curved surface is configured to receive light and transmit the light along a path toward the infrared sensor.

5. The method of claim 1, wherein the ink is a two part epoxy ink opaque to infrared radiation.

6. The method of claim 1, wherein the optical element is a lens and the aperture is printed directly onto the lens.

7. The method of claim 6, wherein the lens is loaded in the printer robotically and load, print, and unload steps are automated.

8. The method of claim 1, wherein applying ink further comprises:
    creating an etched image of the optical aperture in a print cliché;
    inking the print cliché; and
    pad printing the optical aperture from the cliché to the optical element.

9. The method of claim 1, wherein the optical element has an opening diameter of about 10 millimeters or less, wherein the optical aperture has a diameter of between about 10 and about 90 percent of an opening diameter of the optical element.

10. The method of claim 9, wherein the optical aperture has a diameter of between about 60 percent and about 80 percent of the opening diameter of the optical element.

11. The method of claim 1, wherein the optical element is the sole optic element in the optical path of the infrared optical system.

12. A method for producing an infrared optical system consisting of an infrared sensor, an optical element, and a single ink layer, the method comprising:
    placing the optical element in a printer; and
    applying ink in a single layer to at least a portion of the light-receiving surface of the optical element to form an optical aperture of the infrared optical system directly on the optical element,
    wherein the light-receiving surface of the optical element with the optical aperture is an external surface of the infrared optical system.

13. The method of claim 12, further comprising mating the optical element with the infrared sensor, the light-receiving surface comprising a curved portion, wherein at least a portion of the ink extends into the curved portion.

14. The method of claim 12, wherein the ink is a two part epoxy ink opaque to infrared radiation.

15. The method of claim 12, wherein the optical element is the sole optic element in the optical path of the infrared optical system.

16. A method for producing an optical aperture for an infrared optical system consisting of an infrared sensor, an optical element, and a single ink layer, the method comprising:
    creating an aperture pattern defining the optical aperture;
    instantiating the pattern in at least one of a paint mask, a silkscreen mask or a programmed pattern in a printer;
    applying a single layer of at least one of a paintable or printable opaque material to an optical element in the aperture pattern; and
    mating the optical element with an infrared sensor with the aperture pattern disposed on a light-receiving end of the optical element,
    wherein the light-receiving end of the optical element is an external surface of the infrared optical system.

17. The method of claim 16, wherein the optical system is a portion of an infrared camera and the paintable or printable material is opaque to infrared radiation.

18. The method of claim 17, wherein the light-receiving end of the optical element is curved, wherein at least a portion of the printed pattern extends into the curved portion.

19. The method of claim 16, further comprising providing an anti-reflective coating over the light-receiving end of the optical element before applying the paintable or printable opaque material.

20. The method of claim 16, wherein the optical element is the sole optic element in the optical path of the infrared optical system.

* * * * *